(12) United States Patent
Zhirkevich

(10) Patent No.: US 8,074,682 B2
(45) Date of Patent: Dec. 13, 2011

(54) MIXER TAP FOR A THERMAL WAVE MASSAGE DEVICE

(76) Inventor: Vasiliy Yul'evich Zhirkevich, pos. Il'insky (RU)

( * ) Notice: Subject to any disclaimer, the term of this patent is extended or adjusted under 35 U.S.C. 154(b) by 0 days.

(21) Appl. No.: 12/735,108

(22) PCT Filed: Jun. 2, 2009

(86) PCT No.: PCT/RU2009/000277
§ 371 (c)(1),
(2), (4) Date: Jun. 15, 2010

(87) PCT Pub. No.: WO2009/148359
PCT Pub. Date: Dec. 10, 2009

(65) Prior Publication Data
US 2011/0100491 A1    May 5, 2011

(30) Foreign Application Priority Data

Jun. 5, 2008    (RU) ................ 2008122429

(51) Int. Cl.
*F16K 11/074* (2006.01)
*A61H 9/00* (2006.01)

(52) U.S. Cl. ............... 137/597; 137/625.17; 137/625.4; 137/625.41; 239/227

(58) Field of Classification Search .......... 137/597, 137/625.17, 625.4, 625.41; 4/661; 239/227
See application file for complete search history.

(56) References Cited

U.S. PATENT DOCUMENTS

| 2,823,697 | A | * | 2/1958 | Picard | 137/597 |
| 2,847,027 | A | * | 8/1958 | Kumpman | 137/597 |
| 2,887,128 | A | * | 5/1959 | Bloomberg | 137/597 |
| 2,924,243 | A | * | 2/1960 | Cordova | 137/597 |
| 3,130,750 | A | * | 4/1964 | Post | 137/597 |
| 3,542,066 | A | * | 11/1970 | Cordova | 137/597 |
| 3,823,742 | A | * | 7/1974 | Von Corpon | 137/597 |
| 4,562,864 | A | * | 1/1986 | Yang | 137/597 |
| 4,718,128 | A | * | 1/1988 | Fan | 137/597 |
| 4,960,154 | A | * | 10/1990 | Dagiantis | 137/597 |

FOREIGN PATENT DOCUMENTS

| DE | 3418165 | 11/1985 |
| DE | 4005289 | 10/1990 |
| EP | 0119581 A2 | 9/1984 |
| FR | 2800633 | 5/2001 |
| GB | 2432115 A | 5/2007 |
| RU | 2272611 C1 | 3/2006 |

* cited by examiner

*Primary Examiner* — John Rivell
(74) *Attorney, Agent, or Firm* — Aleksandr Smushkovich (57) ABSTRACT

The invention relates to a mixer tap for a thermal wave massage device which is designed in the form of a single lever mixer and makes it possible to control main parameters of the thermal wave massage procedure, i.e., an average temperature, contrast, the direction and speed of a thermal wave, with the aid of a single handle due to a special design that allows operating the mixer tap with two or three degrees of freedom. Moreover, the inventive mixer tap can be used as a diverter and substantially improves the operational safety of the thermal wave massage device. The use of the invention makes it possible to improve the ergonomic characteristics of the thermal wave massage devices, to make them more consumer attractive and to contribute to the wide distribution of the device as an effective conditioning and relaxation means.

6 Claims, 10 Drawing Sheets

MIXER TAP FOR A THERMAL WAVE MASSAGE DEVICE

CROSS-REFERENCE TO RELATED APPLICATIONS

This application is a U.S. national stage application of a PCT application PCT/RU2009/000277 filed on 2 Jun. 2009, whose disclosure is incorporated herein in its entirety by reference, which PCT application claims priority of a Russian Federation application RU2008122429 filed on 5 Jun. 2008.

FIELD OF THE INVENTION

The invention relates to hydrotherapeutic procedures for hygienic or physiotherapeutic goals, specifically to showering and bathing.

BACKGROUND OF THE INVENTION

There is known an original device for peculiar thermal wave massage procedure (Russian patent 2313326 "METHOD AND DEVICE FOR MAKING WATER-THERMAL PROCEDURE", as well as a paper "Devices of Thermal Wave Massage", Jun. 4, 2008, Bank of business-offers, http://www.bizbank.ru). The device comprises of a mixer-controller, which allows for obtaining both hot and cold water with a controlled temperature difference between them. The disadvantage is its limited function: it controls the temperature difference between hot and cold water at the outlet, but is unable to control the average temperature.

There are also known single handle faucets with a ball valve (e.g. U.S. Pat. No. 3,472,279 "Single handle ball valve faucet") or ceramic one (e.g. U.S. Pat. No. 3,736,959 "Single lever faucet"), which regulate both temperature and flow discharge of mixed water by changing the position of a movable part, containing slots (a ball in the first case, and a flat disk in the second one) in relation to an immovable part being in close contact therewith, which immovable part also has slots. The shape of the slots in these parts is chosen in a way such that any change of the current position of the parts relatively to each other causes alterations of the cross-sections of the passages for hot and cold water. As a result, it is possible to control the proportion between the hot and cold water flowing through the passages and, thus, provide the desired temperature and pressure of mixed water. The above-mentioned ceramic faucet is chosen as the closest related art device (prototype) to the invention proposed.

The disadvantage of the described devices is limited functionality thereof that provides for a desired temperature of the mixed water, but does not provide for a controlled difference between the temperatures of outlet hot water and outlet cold water.

The aim of the present invention is to extend the functionality of known hot-cold water mixers, particularly to provide the capability of control of the average temperature of mixed outlet water, as well as of control of the difference between the temperatures of outlet hot water and outlet cold water.

This problem is solved by using a single handle faucet with an operating lever that has two degrees of freedom, one of which is used to control the average temperature of hot and cold water in outlet of the mixer, and the other one is used to control the contrast, i.e. the difference between the temperature of outlet hot water and the temperature of outlet cold water.

Hereafter, we shall refer to the hot and cold water at the outlet of the inventive mixer-controller as 'warm' and 'tepid' water, respectively. Thus we can distinguish between this water and the hot and cold water at the inlet of the mixer-controller. In addition, this definition more adequately describes the reality, because, during the tuning of the mixer, the warm water temperature varies from the temperature of hot water at the hot inlet to an average temperature of the hot and cold water, and the tepid water temperature varies respectively from the temperature of cold water at the cold inlet to the same average temperature of the hot and cold water.

The invention proposes to use a contact pair, consisting of an immovable and a movable part, being in sliding contact with each other; the movable and immovable parts each includes a number of predetermined slots made therein. The movable part is controlled by a lever, and has two degrees of freedom to move relative to the immovable part. In conformity with the proposed invention, there are different design variants of the mixer-controller, which differ by the type of contact surface: flat, spherical, or cylindrical, as well as by the shape of the slots in the contacting parts. However, the design variants are all united by some common features: the mixer has separate outlet openings for warm and tepid water streams, which are formed by mixing the incoming hot and cold water in portions, which depend on the areas of cross sections of the corresponding passages, which areas in turn are determined by the position of the movable part relative to the immovable one.

The shape of the slots is chosen in such a way that a motion of the movable part along a first degree of freedom involves an increase (or decrease) of the hot fraction in the warm water, and a respective increase (or decrease) of the cold fraction in the tepid water that allows changing the difference between the temperature of warm water and the temperature of tepid water (herein further called a 'contrast'); on the other hand, a motion of the movable part along a second degree of freedom involves an increase (or decrease) of the hot fraction (or the cold fraction) in the warm water and in the tepid water synchronously, that allows changing the average temperature of warm and tepid water (herein further called an 'average temperature') simultaneously.

The implementation of the invention improves the ergonomic characteristics of thermal wave massage devices that makes it possible to control main parameters of the thermal wave massage procedure, using only a single handle.

BRIEF DESCRIPTION OF DRAWINGS

There are some of possible design variants of the inventive mixer-controller described below.

DETAIL DESCRIPTION OF PREFERRED EMBODIMENTS OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

Figure 1:
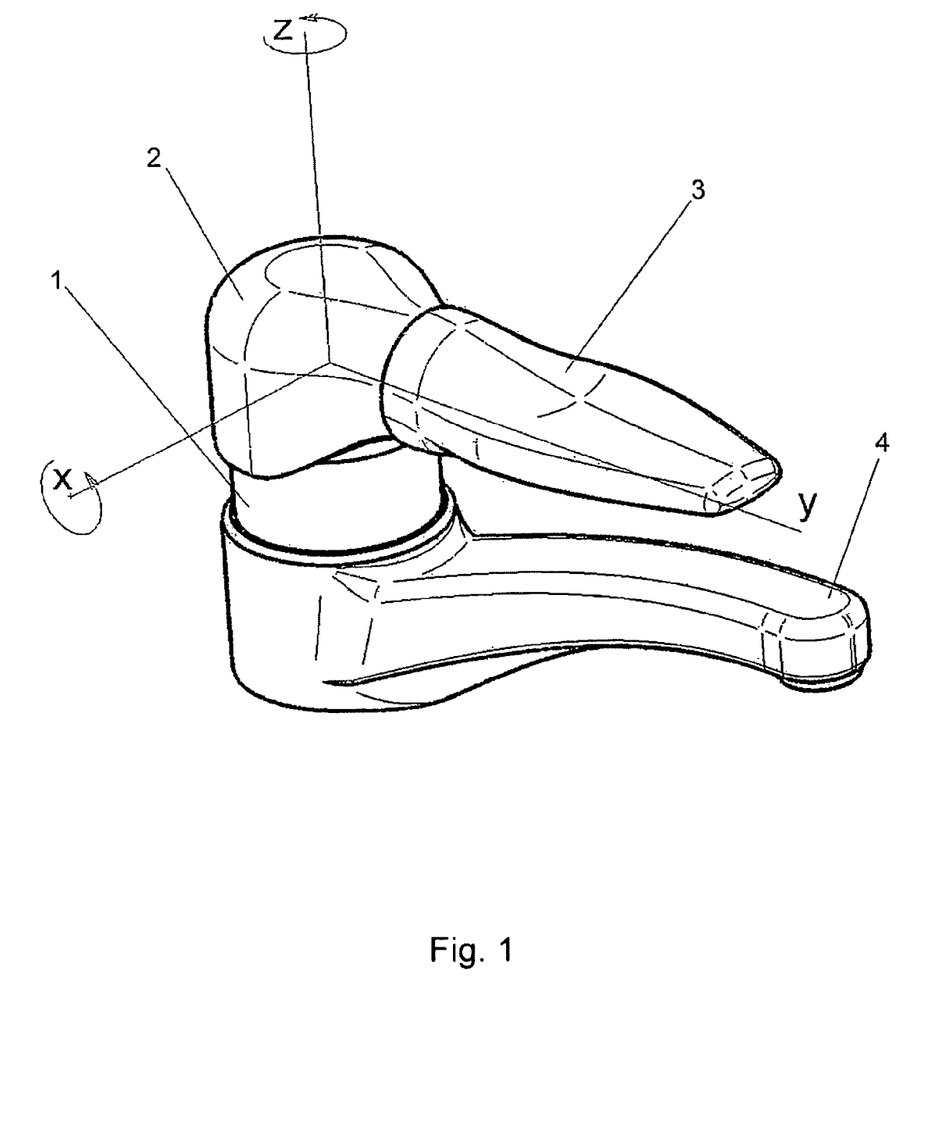
FIG. 1. is a perspective general view of a single handle faucet of the mixer-controller.

In a preferred embodiment of the present invention, shown on FIG. 1, the inventive mixer-controller is preferably utilized as a portion of a thermal wave massage device, and resembles a widespread single handle faucet with a ceramic cartridge or a ball valve. It includes a housing 1, a control lever comprising an operating handle 3 coupled to a faucet head 2, and a spout 4. The operating handle 3 has two degrees of freedom. As a rule, these degrees of freedom are represented by rotations relative to axes X and Z, shown on FIG. 1. In all structures below, a rotation relative to the X-axis is defined to control the contrast level, and a rotation relative to the Z-axis is defined to control the average temperature.

Figure 3:
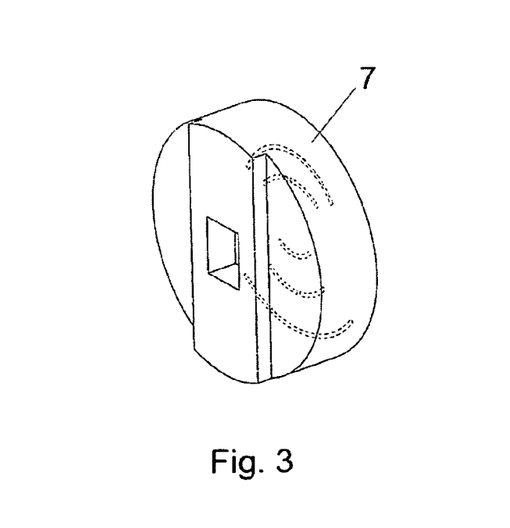
FIG. 3. is a perspective view of a movable part of a contact pair of the cartridge.
Figure 4:
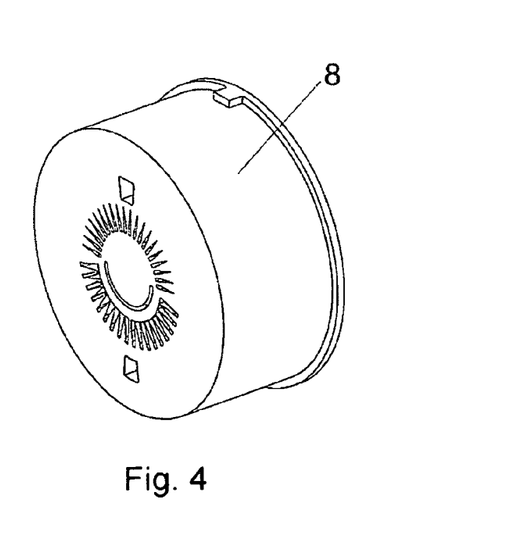
FIG. 4. is a perspective view of an immovable part of the contact pair of the cartridge.

If the inventive mixer-controller is embodied as a "ceramic" faucet, then it has a cartridge (depicted on FIG. 2), which includes a housing 5, in the interior of which there is a control stem 6 coupled to and capable of moving a movable part 7 having a first contact surface; an immovable part 8, having a second contact surface, and fixed to the housing 5, wherein the first contact surface is closely depressed against the second contact surface. The movable part 7 (shown on FIG. 3) includes a first plurality of slots situated on the first contact surface, and the immovable part 8 (shown on FIG. 4) includes a second plurality of slots, situated on the second contact surface. The first and second slots are used for passing water therethrough. The first slots of the part 7 are located on the invisible face, and illustrated on FIG. 3 with dotted lines.

In accordance with this preferred embodiment, it is necessary to make a system of passages of specific shapes in the interior of the parts 7 and 8.

Figure 2:
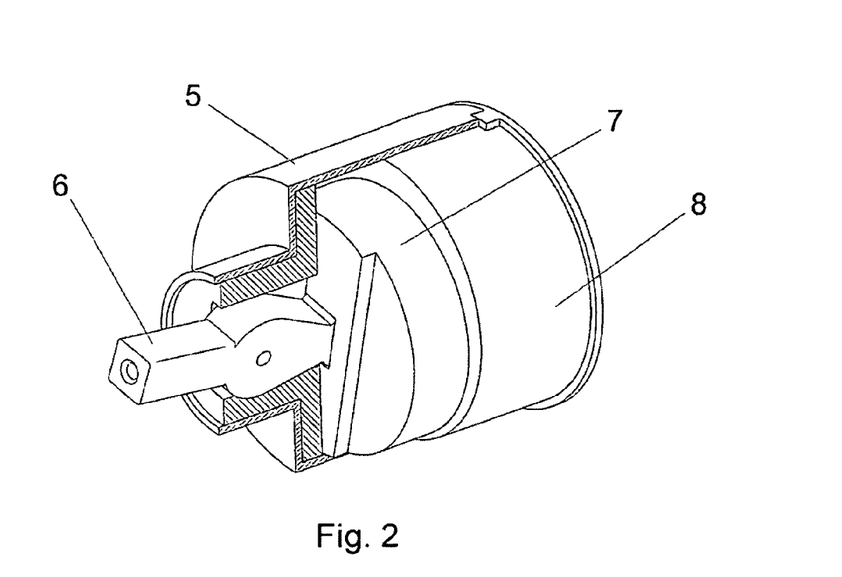
FIG. 2. is a perspective view of a ceramic cartridge for the mixer-controller with a cross-sectional housing.
Figure 5:
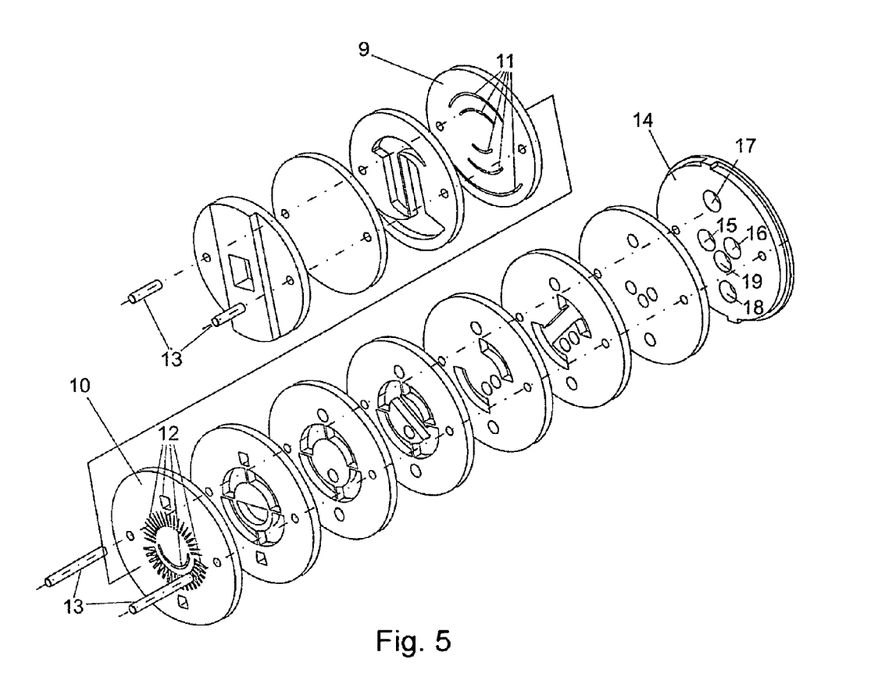
FIG. 5. is an exploded perspective view of the contacting parts as sets of several holed discs.

Technologically, the easiest way to do this is to make these parts as sets of flat disks with slots of a desired configuration; the corresponding embodiment is shown in FIG. 5. At the top of FIG. 5, there are shown a number of disks, which are included in the part 7 (one of these discs is numbered 9). At the bottom of FIG. 5, there are shown a number of disks that are included in the part 8 (one of these discs is numbered 10, the intermediate discs are not numbered); each of the discs, pertained to the part 8, has predetermined slots made in the body thereof. The contacting disk 9, having slots 11, and the contacting disk 10, having slots 12, are placed in direct contact with each other in the assembled state (FIG. 2).

Water flows particularly through the slots 11 and the slots 12. The discs of the parts 7 and 8 each has a pair of fixation orifices; the discs are fixed in a desired position relative to each other by inserting pins 13 into the orifices (as depicted on FIG. 5).

The part 8 includes a cartridge bonnet 14 (placed behind the last intermediate disc) that closes the cartridge assembly. The bonnet 14 comprises: a hot inlet port 15, a cold inlet port 16, a warm outlet port 17, and a tepid outlet port 18. In addition, the cartridge bonnet 14 comprises an auxiliary outlet port 19 to deduce the mixed water to the spout 4.

Figure 7:
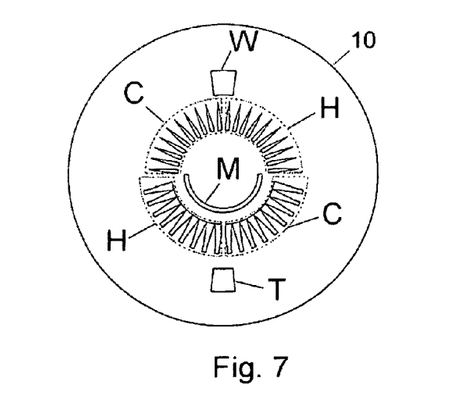
FIG. 7. is a frontal view of the contacting disc accessorial to the immovable contacting part wherein the functions of slots are marked with corresponding letters.

FIG. 5 shows that the hot and cold water flows entered into the mixer from the inlet ports 15 and 16, move through the passage, formed by the slots in the intermediate disks, reach the contacting disk 10, filling its slots 12 in accordance with the scheme depicted in FIG. 7. The scheme illustrates small radial slots grouped into segments, shown in the scheme by dash-dot lines. The segments filled with hot water are marked with a character "H", and the segments filled with cold water are marked with a character "C" respectively.

Figure 6:
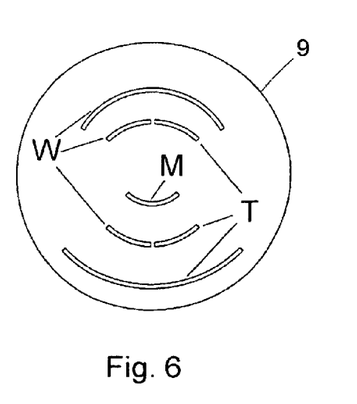
FIG. 6. is a frontal view of the contacting disc accessorial to the movable contacting part wherein the functions of slots are marked with corresponding letters.

Water comes into the part 7 through the slots 11 (FIG. 5) and mixes up there. Water, coming through two short arced slots marked with a character "W" (Warm) in FIG. 6, mixes up and returns into the part 8 through a long arced slot that is marked with a character "W" in FIG. 6, and a trapezium-shape opening marked with a character "W" in FIG. 7. Water, coming through two short arced slots marked with a character "T" (Tepid) in FIG. 6, mixes and then returns to the part 8 through a long arced slot that is marked with a character "T" in FIG. 6, and a trapezium-shape opening marked with a character "T" in FIG. 7. After that, water reaches the outlet ports 17 and 18 (shown on FIG. 5) through the passages in the intermediate disks (warm water and tepid water, respectively).

To ensure the safety of operation of the thermal wave massage device and to eliminate the possibility of getting burnt during its actuation (or on the contrary, a sudden impact on the body by water that is too cold), the mixer should be equipped with a diverter function. In this case, one first adjusts the water temperature by manual control before switching the water over to the shower jets. For this purpose, a short arced slot marked with a character "M" (mixed) is made in the central region of disks 9 and 10. Passing through these slots, water mixed in the part 7 flows through the passages in the intermediate disks of part 8 into the outlet port 19. Inflow of the mixed water in the outlet port 19 occurs only when access of the warm and tepid water to the outlet ports 17 and 18 is blocked, and vice versa.

Figure 8:
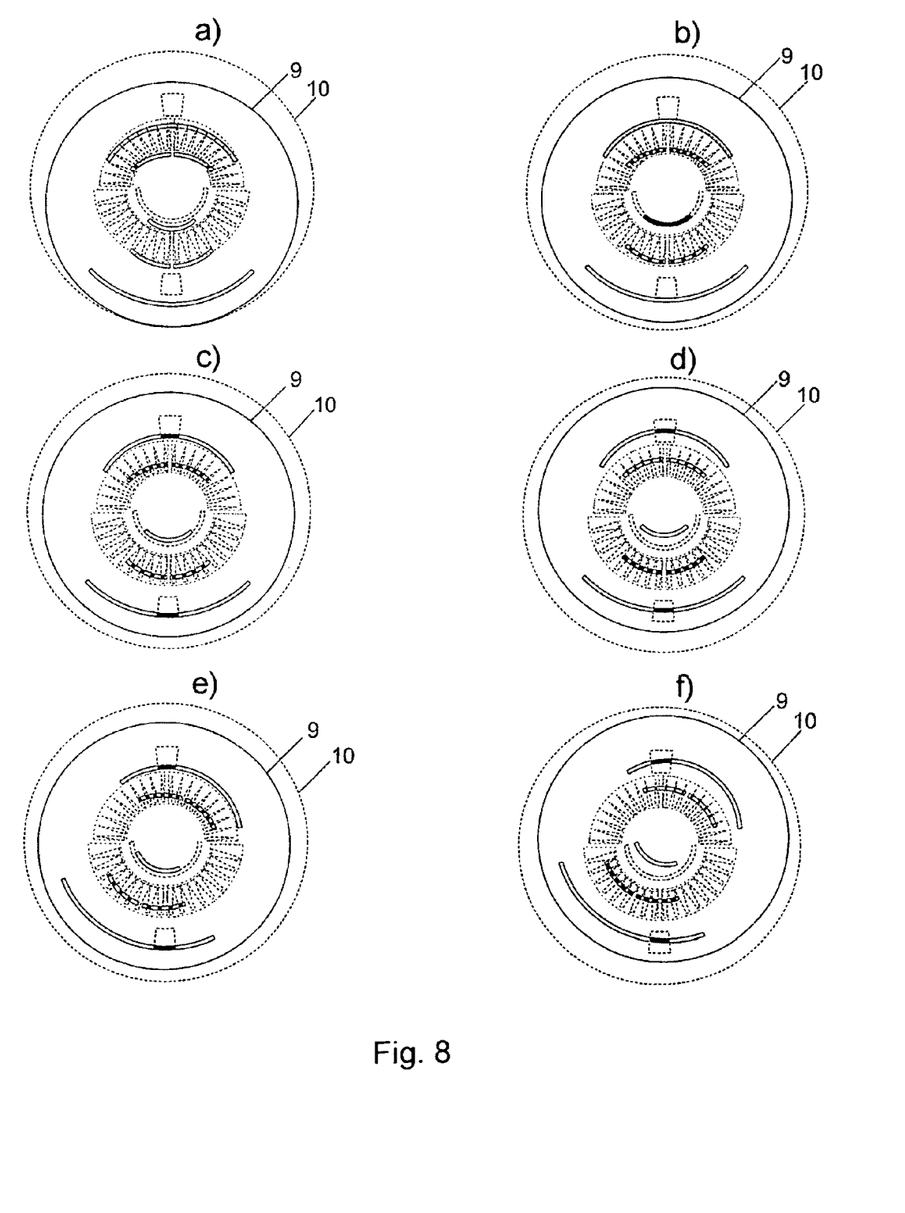
FIG. 8. is a superposed frontal view of the same contacting discs, which are shown for a series of typical positions.

FIG. 8 shows various possible states of the mixer; the areas where the slots 11 and 12 coincide are filled with solid black segments. Contours belonging to the disk 9 are shown by solid lines, and contours belonging to the disk 10 are shown by dashed lines.

FIG. 8a shows the location of the parts in a fully closed state of the mixer, when any water flow is absent. The lifting of the operating handle 3 (in FIG. 1) urges a displacement of the disc 9 vertically upwards (FIG. 8b); as a result, the mixer comes into the following state: the hot and cold water are mixed and the mixed water flows to the spout 4. If the disc 9 is displaced vertically upwards even further (FIG. 8c), a flow of the mixed water to the spout 4 is blocked, and the mixer switches to supply the shower jets, but the contrast is kept at zero, i.e. the temperature of the warm water is equal to the temperature of the tepid water.

Any further upward displacement of the disk 9 (FIG. 8d) leads to a gradual increase in the contrast between the warm and tepid water up to a predetermined maximal contrast reached in the uppermost position of the disk 9, wherein the temperature of warm water is equal to the temperature of the hot water coming into the mixer, and the temperature of tepid water is equal to the temperature of the cold water coming into the mixer. FIG. 8e shows position in which the temperature of the water flowing to the shower jets is increased at a zero contrast by rotating the operating handle 3 relative to the Z axis (as depicted in FIG. 1). FIG. 8f shows an arbitrary position, which can appear during a combined action for control of the average temperature and the contrast.

Thus, the above-described design achieves the aim of the present invention and allows for control of both the average temperature of warm and tepid water flowing to the shower jets and the difference in their temperature. At the same time, the safety of using the presented device is ensured, as the flow of the mixed water to the spout inevitably precedes the shower jets being supplied with a water flow during the activation of the mixer. This makes it possible to choose a safe and comfortable average temperature of water at the preliminary manual adjustment with certainty. In addition, in the case of a sudden change in temperature during the thermal wave massage procedure, it is possible to quickly switch the water flow from the shower jets to the spout just by one quick push.

Figure 9:
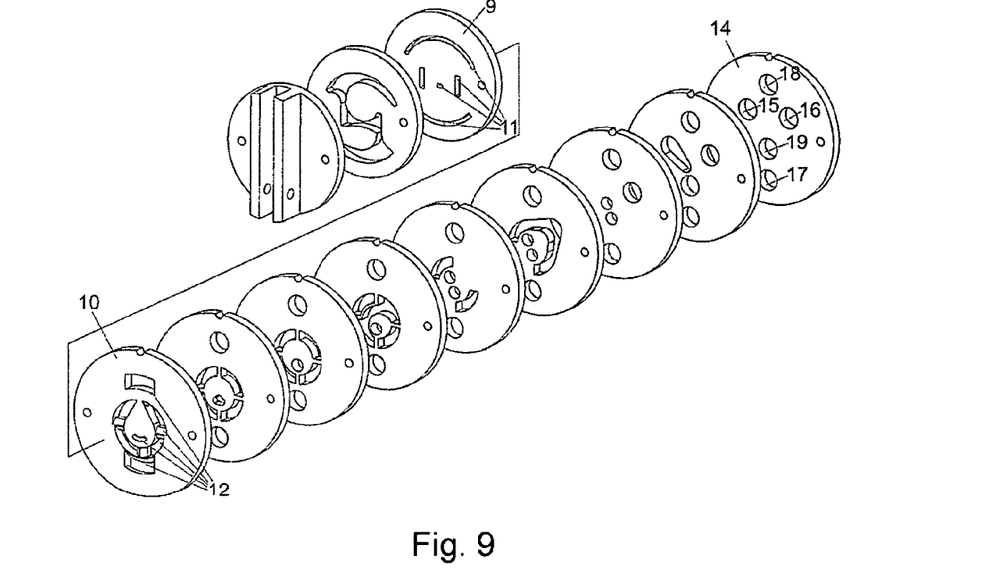
FIG. 9. is an exploded perspective view of the contacting parts as sets of several holed discs for another variant of the shapes of the slots.
Figure 10:
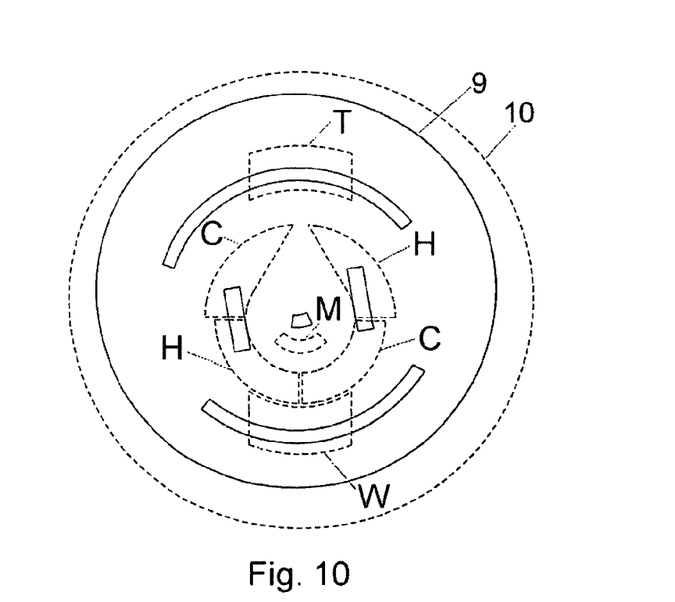
FIG. 10. is a superposed frontal view of the contacting discs for the variant shown in FIG. 9, wherein the functions of slots are marked with corresponding letters.

The above proposed shapes of the slots in the disks of the parts 7 and 8 are not the only ones possible. FIG. 9 is one example of alternative variants, shown with the same reference numerals assigned to corresponding elements of the device. For this variant, FIG. 10 shows the disks 9 and 10, superimposed on each other in an arbitrary intermediate position of the mixer; the contours belonging to the disk 9 are shown by solid lines, and those belonging to the disk 10 are shown by dashed lines, similarly to the ones shown in FIG. 8.

The shapes of the slots can be different, but to ensure that the pressure of both warm and tepid water is constant, for any admissible change in relative positions of the parts, it is desirable to have an invariable sum of corresponding cross-section areas of the channels that feed the warm and tepid outlets. In both of the above-discussed variants this requirement is satisfied.

Figure 11:
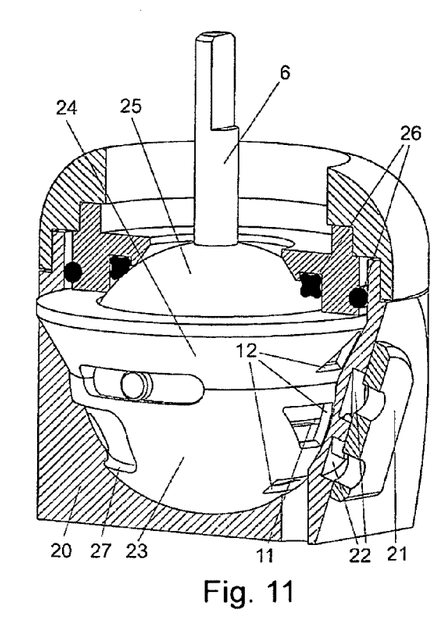
FIG. 11. is a perspective view of a ball valve variant of a cartridge for the inventive mixer-controller with a cross-sectional housing.
Figure 12:
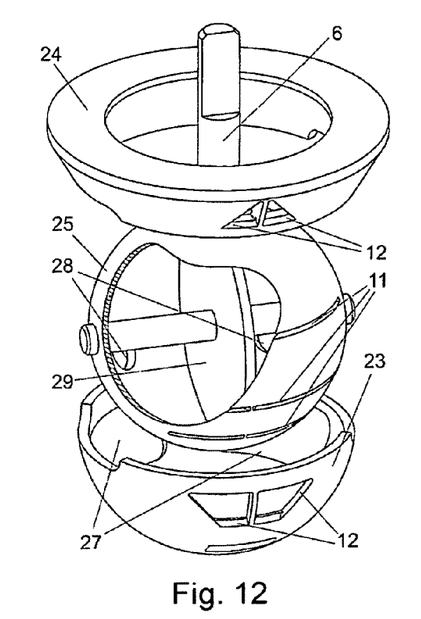
FIG. 12. is an exploded perspective view of a ball assembly for the variant shown in FIG. 11 with a broken-out section of a ball.
Figure 13:
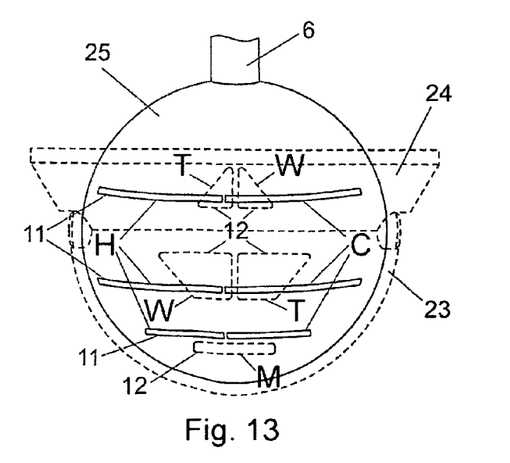
FIG. 13. is a frontal view of the contacting surfaces for the ball valve variant of a cartridge, wherein the shapes of the slots in the movable and immovable parts are shown and the functions of the slots are marked with corresponding letters.

As it is mentioned above, the proposed principle of operation of the mixer-controller can also be embodied in structures similar to the ball valve faucet (depicted on FIGS. 11-13). In this variant, the mixer-controller comprises: a housing 20, a cover 21 with warm and tepid outlets, covering milled-out grooves 22 in the housing 20, which redistribute water streams in accordance with a required scheme. In this case, as seen in FIG. 13, the warm and tepid water from the slots 12 should be withdrawn in accordance with a cross scheme. The housing 20 has a lower support pad 23 and an upper support pad 24, which have a spherical inner surface and envelop a valve ball 25. The device is equipped with suitable sealing gaskets 26, which prevent water leakage. The lower pad 23 has inlet openings 27, and the valve ball 25 has inlet openings 28 for supplying hot and cold water into the chambers formed inside the valve ball 25 and partitioned by a baffle 29.

Actually, the valve ball 25 functions similarly to the movable part 7, and pads 23 and 24 function similarly to the immovable part 8. Slots 12, made in the pads 23 and 24, and slots 11, made in the ball 25, are located on the common spherical contact surface and their relative location is controlled by the position of a control stem 6 and specifies the current state of the mixer in the same way as in the previous examples. The concrete shape of the slots can vary as well.

Figure 14:
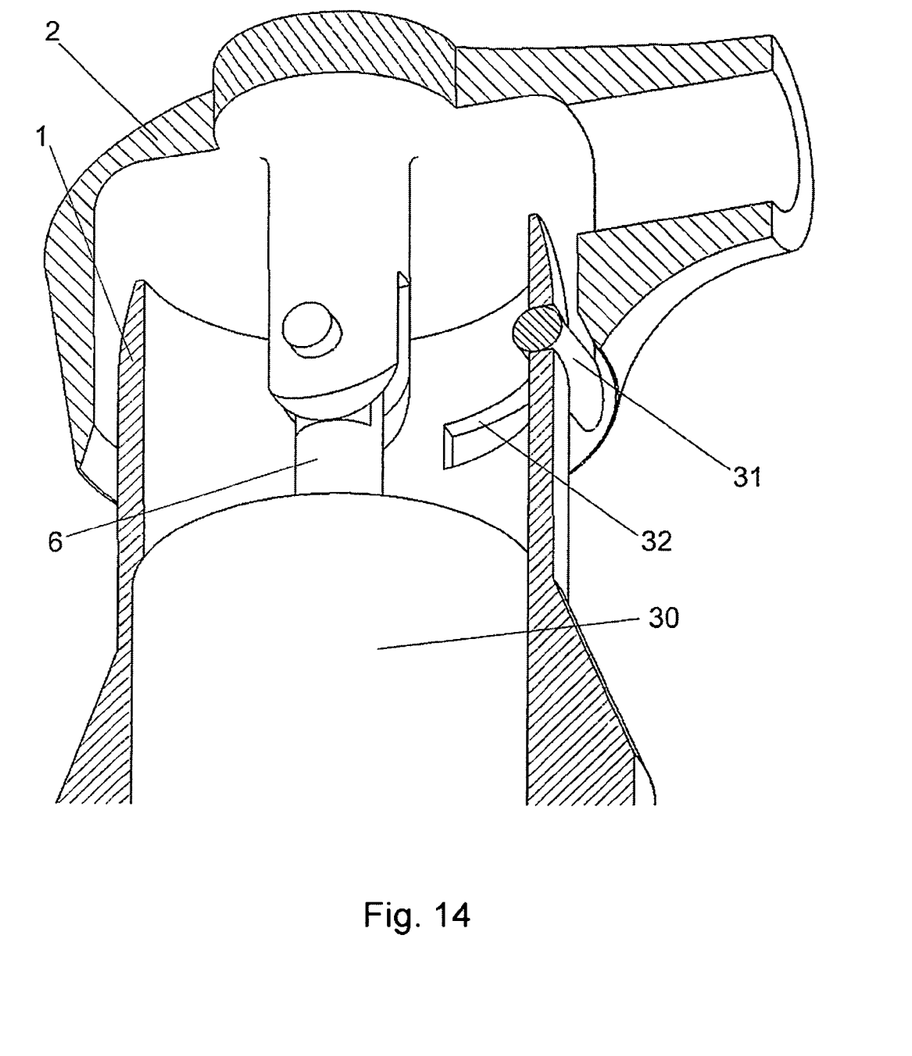
FIG. 14. is a perspective view with a partial cross-section of a possible joint of ahead of an operating lever with a housing of a piston-type mixer, according to another variant of the present invention.

Strictly speaking, in terms of the functional principles of the proposed device the concrete type of contact surface used does not matter. It is an important requirement that the contact surface must permit the existence of two independent degrees of freedom in the relative motion of parts of the contact pair. There are three such surfaces. In addition to the already examined planar and spherical surfaces, the cylindrical surface also satisfies the specified condition. The respective degrees of freedom for the cylindrical surface are: the rotational degree of freedom in the circumferential direction and the longitudinal one along the generatrix of the cylinder. In this connection there is a third variant and a corresponding final group of embodiments of the mixer, herein called a 'piston' type mixer, in which a piston 30 (FIG. 14-16) performs the role of the movable part.

The aforementioned degrees of freedom can be directly used to control the position of the moving parts. However, ergonomic reasons make it more rational to use habitual rotational degrees of freedom of the operating handle (relative to the X and Z axes in FIG. 1). In this case, one of the rotational degrees of freedom can be transformed, for example, using the design shown in FIG. 14. Here, the housing 1 has a notch 32; the head 2 is pivotally connected to control the stem 6, located along the axis of the piston 30. The head 2 includes a pin 31, enclosed into the notch 32. Such design allows for the rotation of the piston by turning the operating handle relative to the Z axis in FIG. 1, and for the progressive motion of the piston along its axis by turning the operating handle relative to the X axis.

Figure 15:
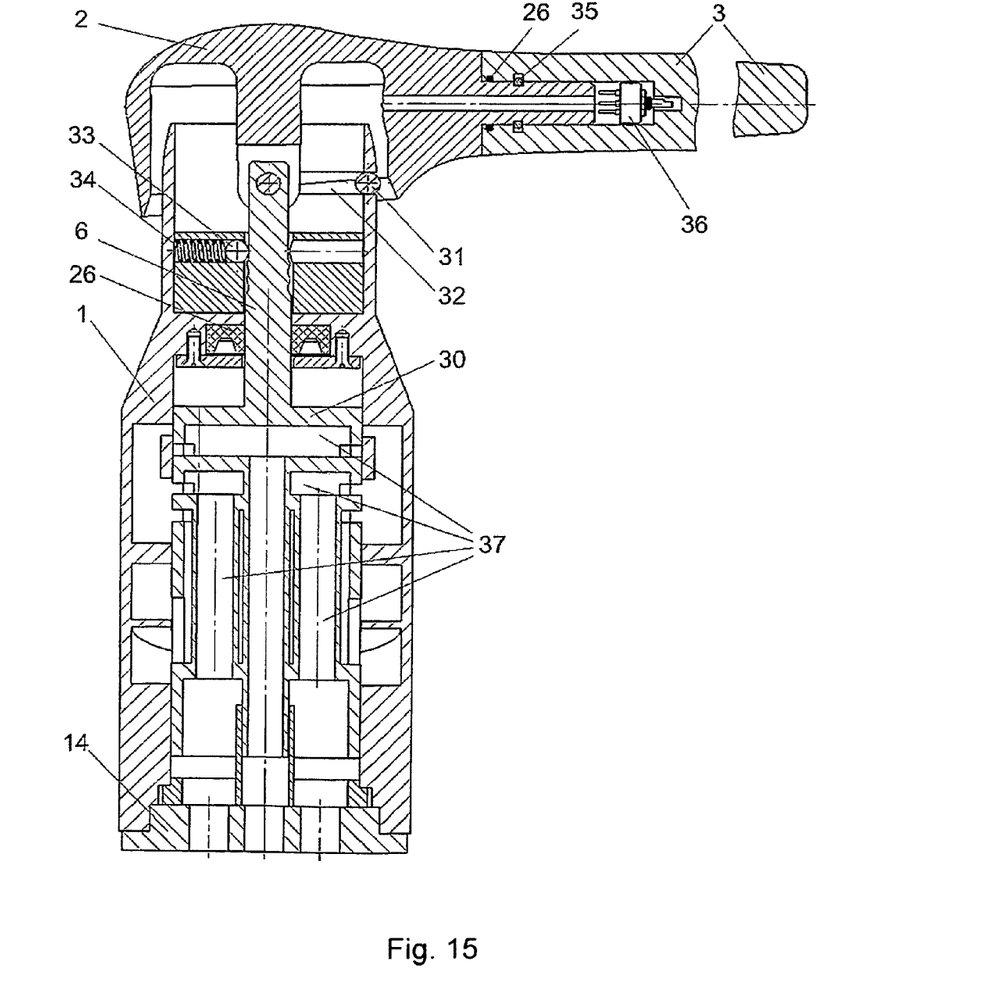
FIG. 15. is a cross-sectional view of the piston-type mixer.

For the convenience of positioning of the operating handle 3 during the water temperature adjustment and the flowing of mixed water to the spout 4, the mixer may comprise a spring retainer including a ball 33 and a spring 34, as shown on FIG. 15. In this embodiment, the stem 6 is furnished with a number of ring-shaped grooves. Getting into the ring groove, the ball 33 facilitates the adjustment, precisely positioning the handle 3 during the temperature adjustment, and making it possible to switch the mixer over to the shower only with an additional effort.

In addition to the average temperature and contrast, a third key adjustable parameter of the thermal wave massage procedure is the direction and speed of the thermal wave. According to another embodiment of the invention illustrated on FIGS. 15 and 16, the proposed mixer contemplates a possibility of controlling this parameter as well. For this purpose, the operating handle is provided with a third degree of freedom, which can be either progressive or rotational. For example, in the case of the rotational degree of freedom, it is possible to turn the operating handle relative to its own longitudinal axis (FIGS. 1, 15, 16), which was not described in the foregoing embodiments. To provide the mentioned possibility, the operating handle 3 is pivotally connected to the head 2 and is protected against slipping by using a retaining ring 35 (FIG. 15). A sealing gasket 26 can be added if necessary.

Depending on the design of the thermal wave massage device, a control signal generated by a turn of the operating handle 3 can be either sensed by a variable resistor 36, embedded in the handle, or transmitted directly to a corresponding executing unit of the device via a flexible shaft, which is passed through special channels in the head of the handle and in the faucet housing. This addition to the design, considered here as an example of a piston-type mixer, is equally applicable to all other previously disclosed variants.

Figure 16:
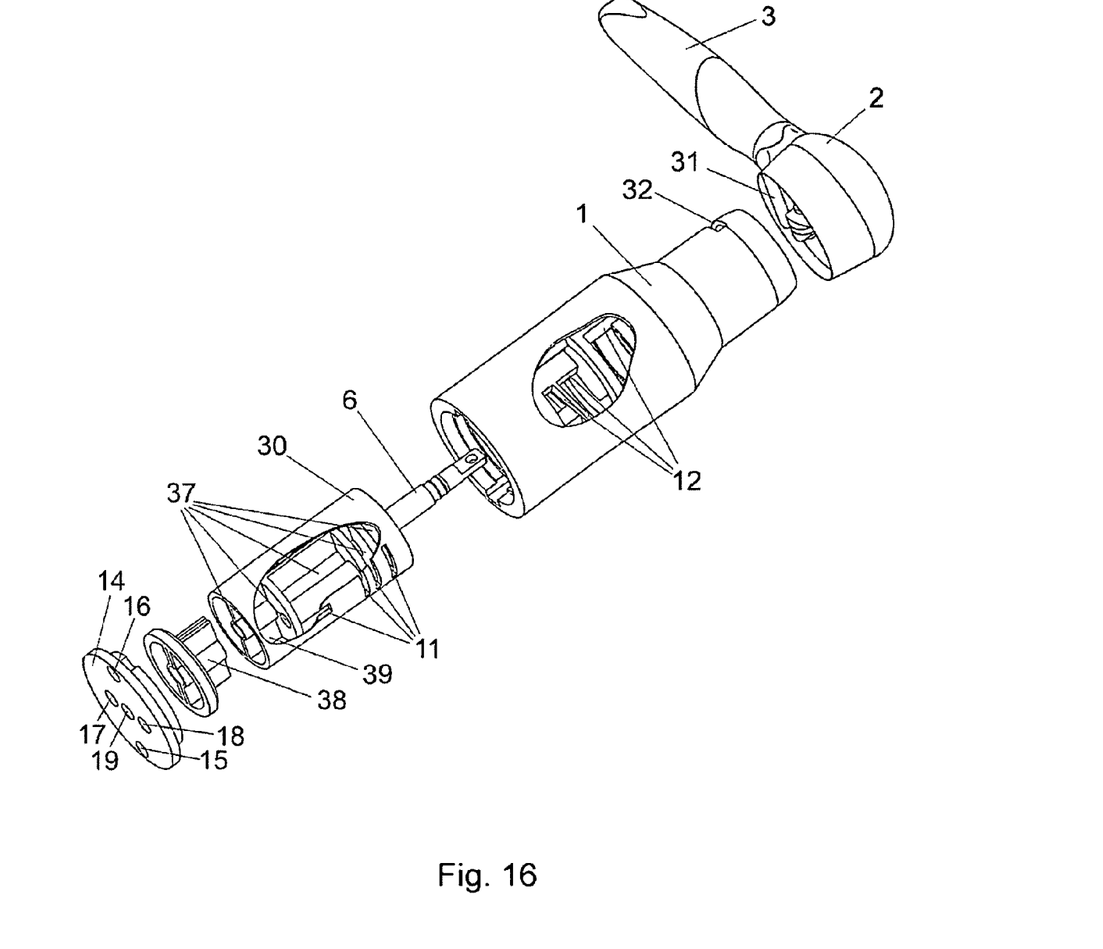
FIG. 16. is an exploded perspective view of the piston-type mixer with partial cross-sections of the piston and housing.

Since the contact surface of the piston-type mixer is a cylindrical surface, the water flow takes place through the lateral surfaces of the piston 30 and of the mixer housing 1 (FIG. 16). Accordingly, a system of slots 11, pertaining to the movable part (piston 30), is arranged in the lateral surface of piston 30; and a system of slots 12, pertaining to the immovable part (housing 1), is arranged inside of the mixer housing 1.

Technologically, the easiest way to fabricate the housing 1 is to make it as a set of coaxial cylinders, the outermost of which serves for enclosing and sealing cavities, formed by the slots, made in the inner cylinder. In addition to the slots 11, the piston 30 has an internal structure, forming a system of cavities and channels 37 for the passing and direction of water flows. A rotating wall 38 is mounted at the bottom of the piston 30 that ensures separation of the cavities for the warm and tepid water, which remain disconnected during turns and longitudinal displacement of the piston 30.

The arrangement of the system of cavities and channels 37 is caused by the need of a diverter function in the mixer (switching from the spout to the shower jets and back, while maintaining the temperature control). If, to facilitate the understanding of the mixer's structure, one ignores the need of having a diverter, then the internal structure of the piston is reduced to a single longitudinal piston baffle 39 mounted within the piston 30, engaged with the rotating wall 38 and dividing the cavities for warm and tepid water; whereas the system of slots 11 will consist of only two diametrically placed narrow longitudinal windows.

Figure 17:
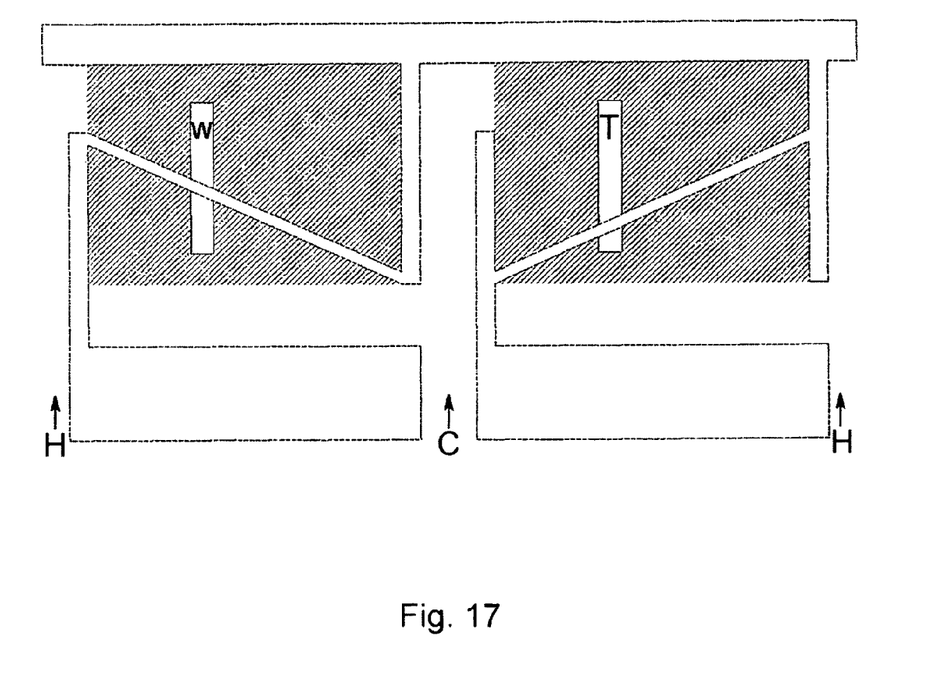
FIG. 17. is a schematically shown unfolding of the contact surfaces of the piston-type mixer on a plane. The shapes of the slots in the movable and immovable parts are shown and the functions of the slots are marked with corresponding letters.

In FIG. 17, which is an unfolding scan (development) of the cylindrical contact surface for the piston-type mixer, the contours belonging to the movable part are shown by solid lines, and contours belonging to the immovable part are shown by dashed lines, as before. The hatched area shows a zone, within which the slots, marked with the characters "W" and "T", can travel during the motion of the piston 30. All admissible combinations of the temperature and contrast may occur within the zone.

The use of the invention makes thermal wave massage devices more attractive for consumers and will contribute to the wide distribution of the devices as the means of effective conditioning and relaxation.

The invention claimed is:

1. A mixer tap for a thermal wave massage device, said mixer tap comprising:
 a housing;
 a number of inlet ports for hot and cold water;
 an operating handle;
 at least one contact pair, including:
  a movable part having a first contact surface of a flat, or a cylindrical, or a spherical type, and movable passage means for passing water therethrough made in the movable part, and
  an immovable part having a second contact surface of a flat, or cylindrical, or spherical type corresponding to the first contact surface, and immovable passage means for passing water therethrough made in the immovable part,
  wherein said immovable part is secured substantially to the housing, said at least one contact pair having two degrees of freedom in a possible motion of said movable and immovable parts relative to each other; and
 at least one outlet port for warm water and at least one outlet port for tepid water, said outlet ports are associated with said passage means;
 wherein the first and second contact surfaces are placed in contact with each other, and the passage means are so configured,
 that a relative position of the movable and immovable parts against each other regulate a proportion between the hot and cold water flowing into said outlet ports, and a shift of the movable part in the direction of one said degree of freedom determines a temperature difference between the warm and tepid water, and a shift in the direction of the other degree of freedom determines an average temperature of the warm and tepid water.

2. The mixer tap according to claim 1, further comprising a spout, and an auxiliary outlet port for passing a mixture of the hot and cold water, wherein said auxiliary outlet port is connected to the spout, and said passage means in the movable and immovable parts provide for passing to said auxiliary outlet port of the mixture at a predetermined position of the movable part, wherein access of water to said outlet ports is blocked at said predetermined position.

3. The mixer tap according to claim 2, wherein said mixer tap is equipped with a retainer, which provides fixing of said handle in a position, corresponding to the direction of the mixture of hot and cold water to the spout, also enabling a free movement of the operating handle in the direction along the degree of freedom responsible for controlling said average temperature of warm and tepid water.

4. The mixer tap according to claim 1, wherein said operating handle is provided with an additional degree of freedom enabling control of a direction and speed of a thermal wave in the thermal wave massage device.

5. The mixer tap according to claim 2, wherein said operating handle is provided with an additional degree of freedom enabling control of a direction and speed of a thermal wave in the thermal wave massage device.

6. The mixer tap according to claim 3, wherein said operating handle is provided with an additional degree of freedom enabling control of a direction and speed of a thermal wave in the thermal wave massage device.

* * * * *